United States Patent [19]

Killinger et al.

[11] 3,709,694
[45] Jan. 9, 1973

[54] BEVERAGE FROM PLANTS OF THE GENUS HEMARTHRIA

[75] Inventors: Gordon B. Killinger, Gainesville; Clarence F. Beckham, Hawthorne, both of Fla.

[73] Assignee: The Institute of Food and Agriculture Sciences, University of Florida, Gainsville, Fla.

[22] Filed: Jan. 25, 1971

[21] Appl. No.: 109,712

[52] U.S. Cl. ..............................99/28, 99/22, 99/73, 99/140 R, 260/236.5, 424/195
[51] Int. Cl. ...............................A23l 1/00, A23l 1/28
[58] Field of Search ......99/28, 22, 73, 75, 77, 140 R, 99/77.1; 424/195; 260/236.5

[56] References Cited

UNITED STATES PATENTS

| 2,369,042 | 2/1945 | Graham et al. | 99/28 |
| 2,115,411 | 4/1938 | Cortez | 99/28 |
| 1,195,152 | 8/1916 | Rich | 99/22 |
| 2,483,634 | 10/1949 | Graham et al. | 9/28 |
| 2,476,581 | 7/1949 | Bloss | 99/28 |

FOREIGN PATENTS OR APPLICATIONS

| 635,053 | 4/1950 | Great Britain | 99/22 |

*Primary Examiner*—Morris O. Wolk
*Assistant Examiner*—Stephen B. Davis
*Attorney*—Stefan M. Stein

[57] ABSTRACT

Beverages are formed by steeping the leaves or stems of any member of the genus of the Hemarthria plant in dry, fermented, or green form. Alternatively, the leaves or stems are extracted with an organic solvent and the beverage formed by dissolving the dried extract in hot water.

10 Claims, No Drawings

BEVERAGE FROM PLANTS OF THE GENUS HEMARTHRIA

BACKGROUND OF THE INVENTION

Field of the Invention

This invention relates to a novel beverage and more particularly to a beverage derived from the plants, *Hemarthria spp.* by steeping its leaves and even its stems, after they are dried or fermented or left green or by dissolving dried extractants of said plant in hot water. More particularly, this invention relates to a beverage formed preferably of the *Hemarthria altissima* plant, by brewing the leaves or stem thereof in green, dried or fermented form in hot water, or adding the dried extract of said plant to hot water.

The discovery and introduction of new, tastier beverages has long occupied the food and beverage industry. Beverages not only increase the intake of liquid into the human body, but also make foods more palatable. Unfortunately, many beverages are expensive to make, difficult to formulate, relatively unstable, subject to deterioration, add substantially to the cost of the liquid to be injested; have deleterious side effects, and are sometimes scarce or seasonal. The reader can, no doubt, easily bring to mind one or more beverages which fit one or more of the above undesirable characteristics. Suffice it to say, mankind has constantly searched for new beverages that are acceptable as either a liquid or food supplement, which, at least, do not have these undesirable characteristics.

SUMMARY OF THE INVENTION

Objectives

An object of this invention is to provide a novel beverage.

Another object is to provide a beverage which is relatively low in cost.

Still another object is to provide a beverage which may take various forms in a raw or concentrated state.

A further object is to provide a beverage which can be readily made by the drinker.

A still further object is to provide a beverage formed as a dried extract and readily made by mere dissolution in water.

Another object is to provide a beverage which has a flavor very similar to tea.

Another object is to provide a beverage which does not contain stimulants such as caffeine, but which can be added, if desired.

Other objects of the invention will in part be obvious and will in part appear hereinafter.

Broad Description of the Invention

It has now been found that the leaves and even the stems of the *Hemarthria spp.* plants, in dry, fermented and even green condition, when steeped in hot water, or when the dried extractants of said plants are dissolved in water produces a unique caffeine-free beverage, resembling to a great extent, ordinary tea. More particularly, when the leaves or stems of any member of the genus of the Hemarthria plant are utilized in dry, fermented or green form and steeped in hot, preferably boiling water, for several minutes, a unique caffeine-free beverage is obtained. Alternatively, the leaves or stems may be extracted with organic solvent such as ether, and the extract dried. It may then simply be dissolved in hot, preferably boiling, water to form said beverage. The beverage is most palatable, is caffeine-free, has no deleterious side effects, is soothing to the stomach, and tends to calm an agitated person.

The invention accordingly comprises the several steps and the relation of one or more of such steps with respect to each of the others, and the composition possessing the features, and the relation of components, which are exemplified in the following detailed disclosure, and the scope of the invention will be indicated in the claims.

DETAILED DESCRIPTION OF PREFERRED EMBODIMENTS

For a fuller understanding of the nature and objects of the invention, reference should be had to the following detailed examples:

EXAMPLE I

Leaves and stems from the *altissima* species of the Hemarthria plant are gathered during various times of the year when the plant is partially or fully mature. This particular species of plant is a stoloniferous perennial grass usually found in and on the edge of vleis in South Africa in both summar and winter rainfall areas. It is best propagated by planting the stolons. It grows well in Florida (up to 4 feet tall and runs up to 20 feet horizontally) Hawaii, Texas and Puerto Rico.

The leaves and stems are dried, some in an oven and some in an autoclave. It is then ground. Five lot samples of each drying method are made. Sample No. 1 comprises dried leaves from grass harvested in June at a tender stage with the *Hemarthria altissima* about 18 to 24 inches in height. Sample No. 2 comprises dried stems harvested on the same date. Sample No. 3 comprises dried leaves harvested in early August when the *Hemarthria altissima* is much more mature and starting to yellow with age, and the plants are about 30 to 36 inches in height. Samples No. 4 and No. 5 comprise the stems harvested on the same date.

Leaves and stems are also harvested from a June harvest. Some are left green and some are fermented by controlled temperatures, humidity, and enzymatic action, which is stopped when the desired color and taste is achieved.

Samples No. 6 (leaves-green), No. 7 (stem-green), No. 8 (fermented) and No. 9 (fermented) are made.

When the samples are brewed in hot water and served to various persons, the reaction was generally that the drink was "good." The taste of the autoclaved samples is preferred over the oven dried samples. The leaves as compared to the stems also possess better taste, but only slightly, in the opinion of the person's remark. With respect to the latter, separation of leaves from stem does not seem to make that big a difference in taste.

EXAMPLE II

When a comparative evaluation with green tea is made to determine its similarity thereto, it will be found that the *Hemarthria spp.* plant is acceptable as a beverage but green tea is preferred for taste.

Green tea (No. 1) and Hemarthria (No. 2) are packaged in heatsealed flo-thru bags made of tea-bag paper. Two teaspoons of sample (the amount usually found in commercial green tea bags) are placed in each bag which is then strung with a tag-identifying the samples No. 1 or No. 2. The samples are not identified to the taster until after tasting.

White china cups are used for evaluating the beverages. Seven tasters of oriental background are instructed to brew the beverages to the strength they usually prefer. Cream, sugar and lemon are provided for use if desired. A score sheet, as follows, is used:

```
NAME              BEVERAGE TEST           DATE
                  Here are two beverage samples.
                  Make each sample to the
                  strength you prefer. You may
                  add any of the following
                  ingredients. Please check which
                  you use:
1. Additives:

Cream             Cream and Sugar
    Sugar
    Lemon             Lemon and Sugar
    Smell and taste the samples and
    please check the following:
                  Sample I       Sample II
2. Color:   Desirable
            Undesirable
3. Odor:    Pleasant
            Unpleasant
4. Flavor:  Pleasant
            Unpleasant
5. Which sample do you prefer?
            Sample 1       Sample 2       Neither
6. Would you buy Sample 1      Sample 2
7. Do you drink tea regularly  occasionally
```

The following results summarize the findings:
1. Additives: None of the tasters used cream, sugar, lemon or any combination of the additives.
2. Color: 6 thought Sample 1 desirable
   2 though Sample 2 desirable
3. Odor: 6 thought Sample 1 pleasant
   2 thought Sample 2 pleasant
4. Flavor: 5 thought Sample 1 pleasant
   2 thought Sample 2 pleasant
5. Preference 7 preferred Sample 1
6. But: 4 would buy Sample 1
   2 would buy neither
7. Tea Drinker: 5 regularly drink tea
   2 occasionally drink tea The following comments are recorded:
1. The grassy, wet hay, and straw-like flavor detracts from the use of No. 2 as a beverage.
2. Green tea usually gives a cool feeling to one taster but neither sample did this.
3. The brown color of No. 2 was undesirable if this is to be compared with a green tea.
4. One taster observed that No. 2 turned from green to brown rather quickly.
5. If No. 2 is introduced as a new beverage, it might be accepted.
6. The addition or blending of No. 2 with another material, i.e., Jasmine flowers to tea, might improve it.
7. No. 2 reminded one member of a Korean dish and he questioned the possibility that this sample had partially fermented. He also mentioned that such a beverage might be readily accepted by Koreans.

EXAMPLE III

Three sets of samples (two per set) of the leaves of *Hemarthria altissima* plant are presented to a taste panel of six persons. The samples are packaged in flo-thru tea bags made of tea bag paper. Two teaspoons of sample (amount in commercial tea bag) are placed in each bag which are then strung with an identifying tag. The samples are not identified to the tasters until the completion of each set.

Each taster is given two white china cups and tea bags for each test. Tasters are allowed to brew the beverage to the strength they usually prefer. The results are as follows:

Set 1
Sample 3 oven dried leaves
Sample 7 autoclaved (120°) leaves

|         |             | Sample 3 | Sample 7 |
|---------|-------------|----------|----------|
| Color:  | Desirable   | 3        | 3        |
|         | Undesirable | 2        | 1        |
|         | No Decision | 1        | 2        |
| Odor:   | Pleasant    | 2        | 3        |
|         | Unpleasant  | 2        | 1        |
|         | No Decision | 2        | 2        |
| Flavor: | Pleasant    | 2        | 3        |
|         | Unpleasant  | 2        | 1        |
|         | No Decision | 2        | 2        |

As a small comment, four preferred Sample 7, two made no decision, and four would buy Sample 7 as a beverage.

Set 2
Sample 1 leaves air dried
Sample 8 leaves air dried and rolled

|         |             | Sample 1 | Sample 8 |
|---------|-------------|----------|----------|
| Color:  | Desirable   | 4        | 2        |
|         | Undesirable | 0        | 2        |
|         | No Decision | 2        | 2        |
| Odor:   | Pleasant    | 3        | 2        |
|         | Unpleasant  | 2        | 3        |
|         | No Decision | 1        | 1        |
| Flavor: | Pleasant    | 2        | 1        |
|         | Unpleasant  | 3        | 2        |
|         | No Decision | 1        | 3        |

As an overall comment, two preferred Sample 1, one preferred Sample 8, two preferred neither, one made no decision. Three would buy Sample 1, one would buy Sample 8 as a beverage.

Set 3
Sample 18 young leaves
Sample 20 mature leaves

|         |             | Sample 18 | Sample 20 |
|---------|-------------|-----------|-----------|
| Color:  | Desirable   | 2         | 2         |
|         | Undesirable | 3         | 2         |
|         | No Decision | 1         | 2         |
| Odor:   | Pleasant    | 3         | 3         |
|         | Unpleasant  | 2         | 1         |
|         | No Decision | 1         | 2         |
| Flavor: | Pleasant    | 3         | 3         |
|         | Unpleasant  | 3         | 2         |
|         | No Decision | 0         | 1         |

As an overall comment, three preferred Sample 20, one preferred neither sample, 2 made no decision, two would buy Sample 18, three would buy Sample 20.
As to specific comments:

Four of the six tasters thought the samples of the untreated young and mature leaves better than the treated samples. However, three of the six tasters thought the autoclaved leaves (No. 7) gave a beverage with a pleasant odor and flavor as well as a desirable color. Some found crackers eaten with the beverage improved its flavor. Sample No. 8 (air dried-rolled leaves) was an example of this agreeable combination. One taster found that Sample 20 (mature leaves) was excellent when a small amount of sugar was added. Sample 18 is somewhat objectionable in flavor as it becomes stronger. Differences in samples of Set 2 are not as distinct as in Set 1. Hay flavor of Sample 3 in Set 1 was objectionable.

EXAMPLE IV

A preliminary feeding trial of 34 days duration is undertaken in which three female weanling rats are fed lyophilized Hemarthria extract at a level of 5 percent incorporation in the Addis basal ration. A similar group of three rats are fed the basal ration only. The mean body weights and feed consumption values are tabulated as follows:

TABLE I.

Body weights and feed intake (Hemarthria extract)

| Treatment | Mean body weight (gm.) start | after 34 days | Feed consumption (gm/rat/day) |
|---|---|---|---|
| Control Addis diet | 51.0 (47-57) | 313.3 (130-144) | 10.1 |
| + Hemarthria Extr. | 51.6 (48-57) | 143.3 (133-153) | 10.7 |

The results clearly indicate that the test group grew at a slightly more rapid rate and consumed slightly more feed. An increased palatability (smell or taste) contributed by the Hemarthria extract might be suggested from these results.

At 34 days the six rats are autopsied and the organs are examined grossly. No abnormalities are detected. Tabulated in Table II are the mean organ weights which also appear to be within normal limits. Tissues are also preserved in 10 percent formalin for microscopic examination, the results of which have not been completed.

Table II.

Organ Weights (gms. or mgs/100 gm. body weight)

| Treatment | Liver (g) | Spleen (g) | Kidneys (g) | Heart (g) | Adrenals (mg) | Thyroids (mg) |
|---|---|---|---|---|---|---|
| Control | 4.30 | 0.24 | 0.82 | 0.41 | 28.3 | 16.4 |
| +Hemarthria altissima Extr. | 4.38 | 0.24 | 0.85 | 0.40 | 29.3 | 11.8 |

Based on the above results, there is no evidence of any harmful effects being produced in rats fed for 34 days a diet containing 5 percent *Hemarthria altissima* extract.

With respect to the species of the Hemarthria genus, all species are operable. These specifically include the diploid $2n=18$, tetraploid $2n=36$, and hexaploid $2n=54$ species as well as others with different chromosome numbers.

It will thus be seen that the objects set forth above, among those made apparent from the preceding description, are efficiently attained and, since certain changes may be made in carrying out the above method and in the composition set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described:

What is claimed is:

1. A beverage consisting essentially of a water solution essentially from the leaves and stems of the plant, Hemarthria.

2. The beverage of claim 1 wherein said plant, Hemarthria, is of the *altissima* species.

3. The beverage of claim 1 wherein said water solution is formed by steeping said leaves and stems in hot water.

4. The beverage of claim 1 wherein said leaves and stems are first dried.

5. The beverage of claim 1 wherein said leaves and stems are fermented.

6. The beverage of claim 1 wherein said water solution is obtained by extracting said leaves and stems with an organic solvent, drying the extract and then dissolving said extract in water.

7. A method for making a beverage comprising making a water solution from the leaves and stems of the plant, Hemarthria.

8. The method of claim 7 wherein said water solution is made by steeping dried leaves and stems of said plant in hot water.

9. The method of claim 7 wherein said water solution is made by steeping fermented leaves and stems of said plant in hot water.

10. The method of claim 7 wherein said water solution is made by dissolving an organic solvent extract of said leaves and stems of said plant in hot water.

* * * * *